UNITED STATES PATENT OFFICE.

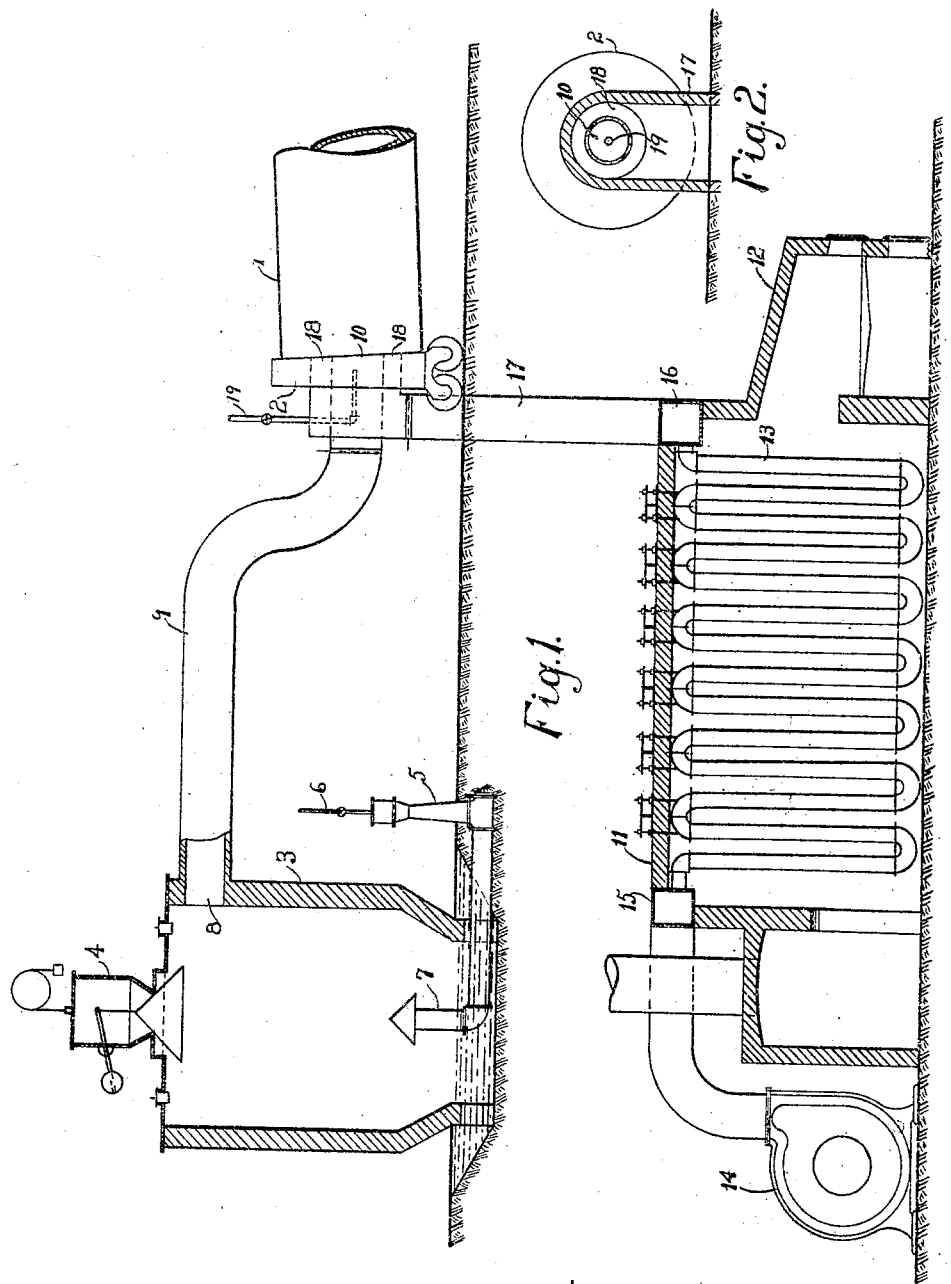

HENRY L. DOHERTY, OF NEW YORK, N. Y., ASSIGNOR TO COMBUSTION UTILITIES COMPANY, OF NEW YORK, N. Y., A CORPORATION OF NEW YORK.

CEMENT-BURNING APPARATUS.

No. 918,020.

Specification of Letters Patent.

Patented April 13, 1909.

Application filed November 14, 1905. Serial No. 287,217.

*To all whom it may concern:*

Be it known that I, HENRY L. DOHERTY, a citizen of the United States, and a resident of New York, in the county of New York and State of New York, have invented certain new and useful Improvements in Cement-Burning Apparatus, of which the following is a specification.

This invention relates to apparatus for burning cement by means of producer gas, and has for its object the combustion of the gas with preheated air under conditions which permit of the attainment of the very high temperature necessary for the effective and rapid clinkering of cementitious material.

In the efforts which have been made in the past to burn cement with producer gas most investigators have overlooked the important fact that air at a high temperature is necessary for creating the requisite flame temperature of the gas undergoing combustion in the cement kiln. If cold air is used for this purpose, a flame temperature rarely exceeding 2200° is obtained. Inasmuch as the clinkering temperatures range between 2500° and 3000° F., such a method of procedure has been ineffectual. By preheating the air it is possible to secure the temperature desired, but preheating cannot be attained in the manner heretofore attempted without apparatus of the most costly character. Preheating the air by means of the heat derived from the hot clinker as it discharges from the kiln has not been found feasible; the air is not heated to the proper temperature, and frequently steam is thereby introduced with the air into the kiln, for the reason that the hot clinker is usually treated with a spray of water soon after its exit from the kiln to assist in cooling and to bring about a certain degree of hydration of the free lime and the calcium sulfate. Owing to its high specific heat, steam entering the kiln in this manner tends to reduce the flame temperature. In other cases recuperators or stoves have been placed in the stacks of the kilns in order to make use of the waste heat of the escaping kiln gases. With short kilns, that is to say, those of a length of 35 to 60 feet, the temperature of the stack gases is sufficiently high to secure some degree of preheat for the air, but with the longer kilns, such as are coming into extensive use at the present time, the temperature of the escaping gases is so low that the air supplied through such regenerators or recuperators does not acquire a temperature sufficient to effect a large output of cement.

My invention overcomes the difficulties above cited, and permits of the heating of the air in a rapid and effective manner to any desired temperature, and therefore enables me to secure the very high temperature required for an output of cement of commercial importance.

It consists in the combination with a gas producer and cement kiln of the ordinary rotary inclined type adapted to feed cement material downwardly therethrough as a traveling stream along its bottom, of a preheating stove which is externally fired, that is to say, is heated by some source of heat external to that supplied to or by the kiln or to or by its discharging products.

In order to make my invention better understood, I shall make reference to the accompanying drawings, forming a part of this specification, and in which—

Figure 1 shows in section a gas producer and a preheating stove connected to a cement kiln, only the lower portion of the latter being shown. Fig. 2 illustrates the method of admitting the air and gas to the kiln.

Like reference characters denote like parts in the two figures.

In the drawings, 1 is a cement kiln having a hood 2 closing its lower end.

3 is a gas producer having a fuel hopper 4, the "blower" or injector 5 provided with the jet 6, and the blast-distributing up-take and hood 7.

8 is an outlet for the combustible gas.

9 is a conduit or discharge terminating in the aperture 10 in the hood 2 and discharging hot gas from the producer directly therethrough.

11 is a preheating stove, having the fire box 12 and a series of pipes 13, which are made preferably of cast iron, and which preferably have webs, or fins, projecting inwardly from their interior surfaces in order to afford a very large radiating and contacting surface.

14 is a fan blower which supplies air to the trunk 15.

At 16 is an off-take trunk connecting with the conduit 17, which communicates with the kiln and is provided with a discharge port 18 which is an annular opening surrounding the gas discharge port 10.

19 is a pipe for supplying air, preferably compressed, terminating in the center of the gas port.

My method of operation is as follows: A deep bed of ignited coal or other fuel is built up in the producer and a blast of air, or of air and steam, or of air and products of combustion, is introduced by the blower into the fire. The gas produced by this draft-current in passing through the fire is withdrawn at 8, traverses the conduit 9, and discharges into the kiln at 10 still hot from the producer. A fire is started in the fire-box 12 of the stove 11, and the flame from this fire-box, or the hot gases therefrom travel around the pipes 13 and then escape to the stack. The fan 14 is put in operation and a current of air is forced through the hot pipes 13 which air is thereby heated to a high temperature. It thereupon departs through the passages 16 and 17 and discharges into the kiln around the incoming gas. The mixture is ignited by any suitable means, as for instance, by starting a wood fire in the lower end of the kiln prior to the introduction of the air and gas. Compressed air may now be admitted through the jet 19, and the jet may be directed so that the air discharging therefrom, entering the kiln at a high velocity, will cause the flame to impinge upon the cement material. Under these conditions, combustion of the gas is very rapid and a white flame of intensely high temperature develops around the cement material, rapidly transforming it into clinker. The higher the temperature of the incoming air, the more intense will be the combustion and the more rapidly the material may be fed downwardly through the kiln. Thus it is possible by having air of a sufficiently high temperature to rotate the kiln very rapidly and secure a very large output. This has not been possible heretofore for the reason that the methods of preheating employed were such as to make it impossible to bring the air to the high temperature required for rapid combustion. The pressure under which producer gas is ordinarily delivered to the kiln is from one to three inches of water, and this is not sufficient to drive the flame forcibly into the kiln in such a manner that a clinkering temperature is produced some distance from the hood, and as a result the combustion by the older methods took place very close to the front end of the kiln, and consequently, clinkering took place almost at the time when the material was ready to discharge from the kiln. Any irregularities in the flame, and consequent fluctuations in temperature caused the material to discharge in an underburned condition. By my system of air and gas admixture the zone of clinkering is developed so far up in the kiln that the troubles heretofore experienced through fluctuations of the flame are eliminated.

The rotary inclined kiln shown is operated in the usual manner, comminuted raw cement material being introduced at its upper end (not shown) and the finished clinker discharged at its lower end through a suitable duct in the hood, the material traveling between these points as a continuous stream on the bottom and lower ascending quadrant of the kiln in the usual manner.

The stove may be heated by any suitable fuel. As illustrated, it is constructed to use wood or coal. It is desirable with a coal fired stove to so conduct the combustion that a short flame is produced, as the direct impingement of the flame upon iron pipe causes its rapid destruction. When coals which produce a long flame are employed it is desirable to arrange baffles, or the like, so that the pipes are not exposed to the direct action of the fire.

While I have stated that cast iron pipe is to be preferred for the purposes of this invention, it is to be understood that tubes or flues of refractory material may be employed. For very high temperatures such materials are in fact preferable, and it is possible to use a metal pipe for heating the air to a certain temperature, and to finish the preheating by passage through flues of refractory material.

The air for supporting combustion in the kiln may by my system be first heated to upward of 400° F. by passage through a recuperator or stove placed in the kiln stack or housing and may then be conducted through heat insulated passages to the separately-fired stove, there being given the final high degree of heat required. A stack stove is a very satisfactory means for accomplishing the first stage of preheating, although the hot clinker discharging from the lower end of the kiln also affords a source of waste heat which may be used for the purpose.

By taking the gas still hot from the producer and burning it with very hot air, the necessary high clinkering temperature may be cheaply furnished in the rotary cement kiln without use of comparatively costly concentrated fuels like powdered coal.

Having now described my invention and shown in what manner it may be performed, what I claim and desire to secure by Letters Patent is:

1. Apparatus for burning cement comprising a rotary inclined cement kiln adapted to maintain a continuous downwardly traveling stream of cement material therethrough, a gas producer, a pipe connection directly discharging hot gas therefrom axially in the kiln, and means for supplying a sheath of fire-heated hot air to said axially introduced gas for the purpose of burning the same.

2. Apparatus for burning cement comprising a rotary inclined cement kiln adapted to maintain a continuous downwardly traveling stream of cement material therethrough, a gas producer, a pipe connection directly discharging hot gas therefrom axially in the kiln, and means for supplying a sheath of hot air to said axially introduced gas for the purpose of burning the same, said means comprising a fire-heated stove for heating the air.

3. Apparatus for burning cement comprising a rotary inclined cement kiln adapted to maintain a continuous downwardly traveling stream of cement material therethrough, a gas producer, a pipe connection directly discharging hot gas therefrom axially in the kiln, and means for supplying a sheath of fire-heated hot air to said axially introduced gas for the purpose of burning the same, and means for transporting the resultant flame to a point beyond the mouth of kiln and for guiding its direction.

4. Apparatus for burning cement comprising a rotary inclined cement kiln adapted to maintain a continuous downwardly traveling stream of cement material therethrough, a gas producer, a pipe connection directly discharging hot gas therefrom axially in the kiln, and means for supplying a sheath of hot air to said axially introduced gas for the purpose of burning the same, and means for transporting the resultant flame to a point beyond the mouth of kiln and for guiding its direction, said means comprising an axial jet of high pressure air.

5. Apparatus for burning cement comprising a rotary inclined cement kiln adapted to maintain a continuous downwardly traveling stream of cement material therethrough, means for furnishing an axial flame therein and means for directing an axial jet of high pressure air into the core of such flame to carry it into the kiln and control its direction.

6. Apparatus for burning cement comprising a rotary inclined cement kiln adapted to maintain a continuous downwardly traveling stream of cement material therethrough, a closing hood for the lower end, a pipe connection therethrough adapted to introduce a jet of gas axially of the kiln, a concentric pipe adapted to furnish a sheath of hot air around said jet, means for delivering hot air to the concentric pipe, such means comprising an externally heated stove, and means for furnishing a jet of compressed air axially of the gas jet to direct the flame.

7. Apparatus for burning cement comprising a rotary inclined kiln adapted to maintain a continuous downwardly traveling stream of cement material therethrough, a hood for the lower end of the kiln, a gas producer, a pipe connection discharging gas through a circular port in the hood, an air preheating stove separately fired, and a pipe connection taking air from the heater and discharging the same annularly around the gas port.

8. Apparatus for burning cement comprising a rotary inclined kiln adapted to maintain a continuous downwardly traveling stream of cement material therethrough, a gas producer, an air preheating stove, means for introducing the air and gas into the kiln to form flame, and means for carrying said flame to a distance from the mouth of the kiln.

9. Apparatus for burning cement comprising a rotary inclined kiln adapted to maintain a continuously downwardly traveling stream of cement material therethrough, a gas producer, means for feeding gas hot from the producer into the mouth of said kiln, means for fire-heating air, means for introducing such fire-heated air as an enveloping sheath around the hot gas entering the kiln, and means for introducing a directing jet of air axially of the body of hot gas.

Signed at New York, in the county of New York, and State of New York, this 10th day of Nov. A. D. 1905.

HENRY L. DOHERTY.

Witnesses:
  CARLETON ELLIS,
  FLETCHER P. SCOFIELD.